United States Patent
Sakurai

[19]

[11] Patent Number: 6,089,761
[45] Date of Patent: *Jul. 18, 2000

[54] CAMERA SYSTEM

[75] Inventor: Hiroshi Sakurai, Kawasaki, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/788,084

[22] Filed: Jan. 22, 1997

[30] Foreign Application Priority Data

Jan. 31, 1996 [JP] Japan ................................. 8-035825

[51] Int. Cl.$^7$ ................................................. G03B 17/14
[52] U.S. Cl. .......................................... 396/531; 359/828
[58] Field of Search ..................... 396/529, 530, 396/531, 532; 359/819, 827, 828

[56] References Cited

U.S. PATENT DOCUMENTS 4,199,248  4/1980  Schlapp et al. .......................... 396/531
5,570,153  10/1996  Shono ....................................... 396/531

OTHER PUBLICATIONS

Patent Abstracts of Japan No. JP 02 033267 A, published Feb. 2, 1990.
Patent Abstracts of Japan No. JP 02 033268 A, published Feb. 2, 1990.
Patent Abstracts of Japan No. JP 02 035428 A, published Feb. 6, 1990.
Patent Abstracts of Japan No. JP 07 128723 A, published May 19, 1995.

*Primary Examiner*—Alan A. Mathews
*Attorney, Agent, or Firm*—Robin, Blecker & Daley

[57] ABSTRACT

A second camera system is different from a first camera system in size of film to be used. While the first camera system is composed of a first camera body having a first camera bayonet mount and using a film of a first size and a first interchangeable lens having a first lens bayonet mount which is connectable to the first camera bayonet mount of the first camera body, the second camera system is composed of a second camera body having a second camera bayonet mount of which a configuration angle of a bayonet claw is different from that of the first camera bayonet mount and using a film of a second size which is smaller than the first size and a second interchangeable lens having a second lens bayonet mount which is connectable to the second camera bayonet mount and of which a configuration angle of a bayonet claw is different from that of the first lens bayonet mount, wherein the configuration angle of the bayonet claw of the second camera bayonet mount is set such that the second camera bayonet mount is connectable to both the first lens bayonet mount and the second lens bayonet mount, and the configuration angle of the bayonet claw of the second lens bayonet mount is set such that the second lens bayonet mount is connectable only to the second camera bayonet mount.

5 Claims, 9 Drawing Sheets

CAMERA SYSTEM

BACKGROUND OF THE INVENTION

1. Field of the Invention

This invention relates to a camera system arranged to permit use of not only interchangeable lenses of the conventional camera system but also interchangeable lenses having a shorter back focal distance than the conventional camera system.

2. Description of Related Art

It has been known to use a mount adapter in mounting a detachable interchangeable lens on a camera body not designed for use of that lens, as disclosed in Japanese Laid-Open Patent Application No. HEI 2-35428.

Meanwhile, in Japanese Laid-Open Utility Model Application No. HEI 5-25435, there is disclosed a technique of setting an interchangeable lens to which a mount adapter is attachable and an interchangeable lens to which the mount adapter is not attachable, by suitably configuring a bayonet mount of the mount adapter and bayonet mounts of the interchangeable lenses.

More specifically, a protruding part is formed at a part of the mount adapter where no bayonet claw is formed. The bayonet mount of the interchangeable lens to which the mount adapter is attachable is in a shape obtained by cutting off its part interfering with the protruding part. The bayonet mount of the interchangeable lens to which the mount adapter is not attachable, on the other hand, is in a shape having its part interfering with the protruding part not cut off. Accordingly, even if the mount adapter is intended to be attached to the interchangeable lens to which the mount adapter is not attachable, the mount adapter cannot be attached to that interchangeable lens, because the protruding part of the mount adapter interferes with that part of the bayonet mount of that interchangeable lens.

BRIEF SUMMARY OF THE INVENTION

In accordance with one aspect of this invention, while a first camera system is composed of a first camera body having a first camera bayonet mount and using a film of a first size and a first interchangeable lens having a first lens bayonet mount which is connectable to the first camera bayonet mount of the first camera body, a second camera system is composed of a second camera body having a second camera bayonet mount of which a configuration angle of a bayonet claw is different from that of the first camera bayonet mount and using a film of a second size which is smaller than the first size and a second interchangeable lens having a second lens bayonet mount which is connectable to the second camera bayonet mount and of which a configuration angle of a bayonet claw is different from that of the first lens bayonet mount, the configuration angle of the bayonet claw of the second camera bayonet mount is set such that the second camera bayonet mount is connectable to both the first lens bayonet mount and the second lens bayonet mount, and the configuration angle of the bayonet claw of the second lens bayonet mount is set such that the second lens bayonet mount is connectable only to the second camera bayonet mount.

The above and other aspects and features of this invention will become apparent from the following detailed description of an embodiment thereof taken in connection with the accompanying drawings.

DETAILED DESCRIPTION OF THE INVENTION

An embodiment of this invention will be described in detail below with reference to the drawings.

Figure 1:
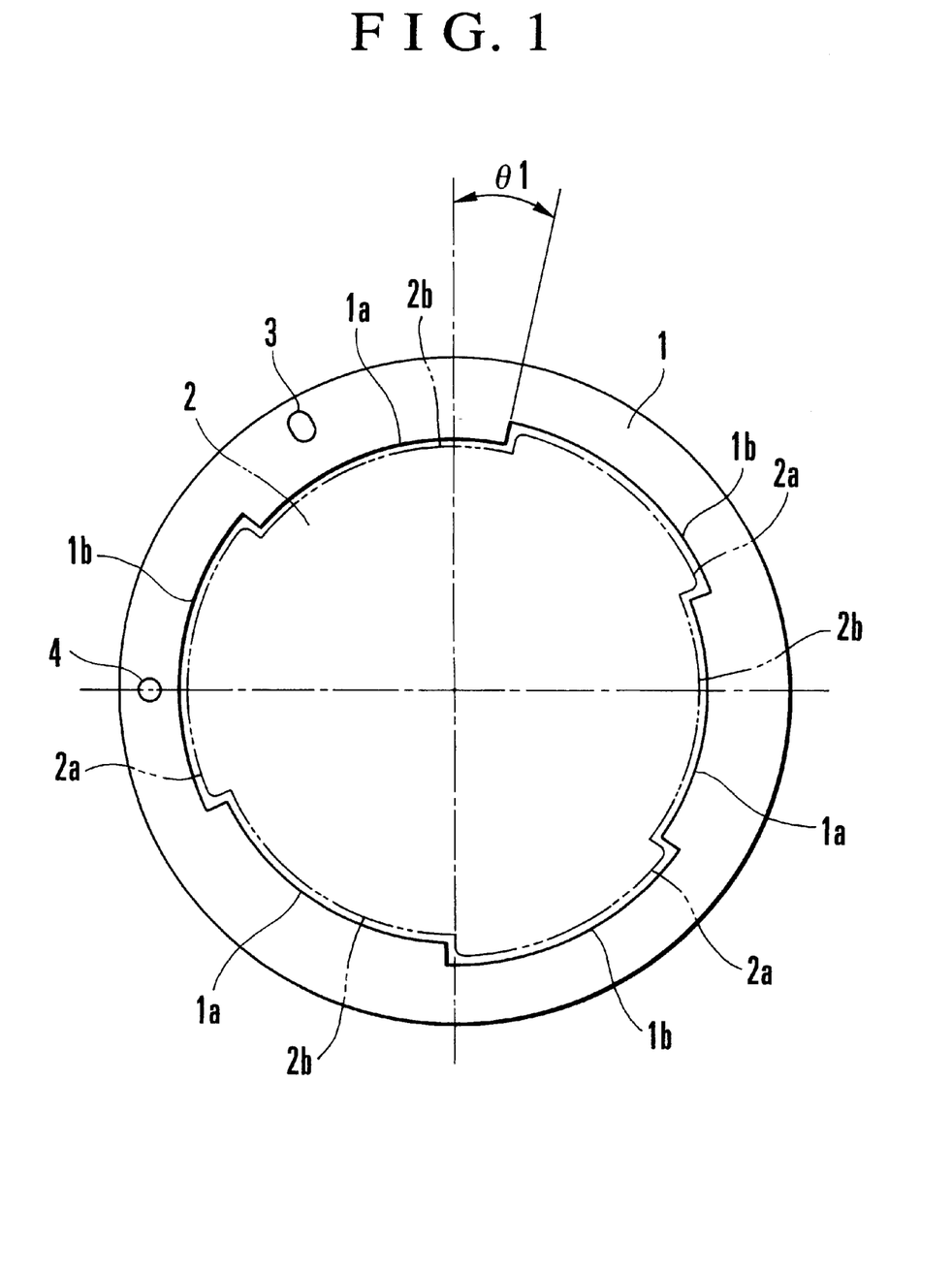
FIG. 1 is a front view showing a state in which a bayonet mount of an interchangeable lens of a camera system using a 135 film is inserted into a bayonet mount of a camera body of the same camera system before these bayonet mounts begin to engage with each other.
Figure 2:
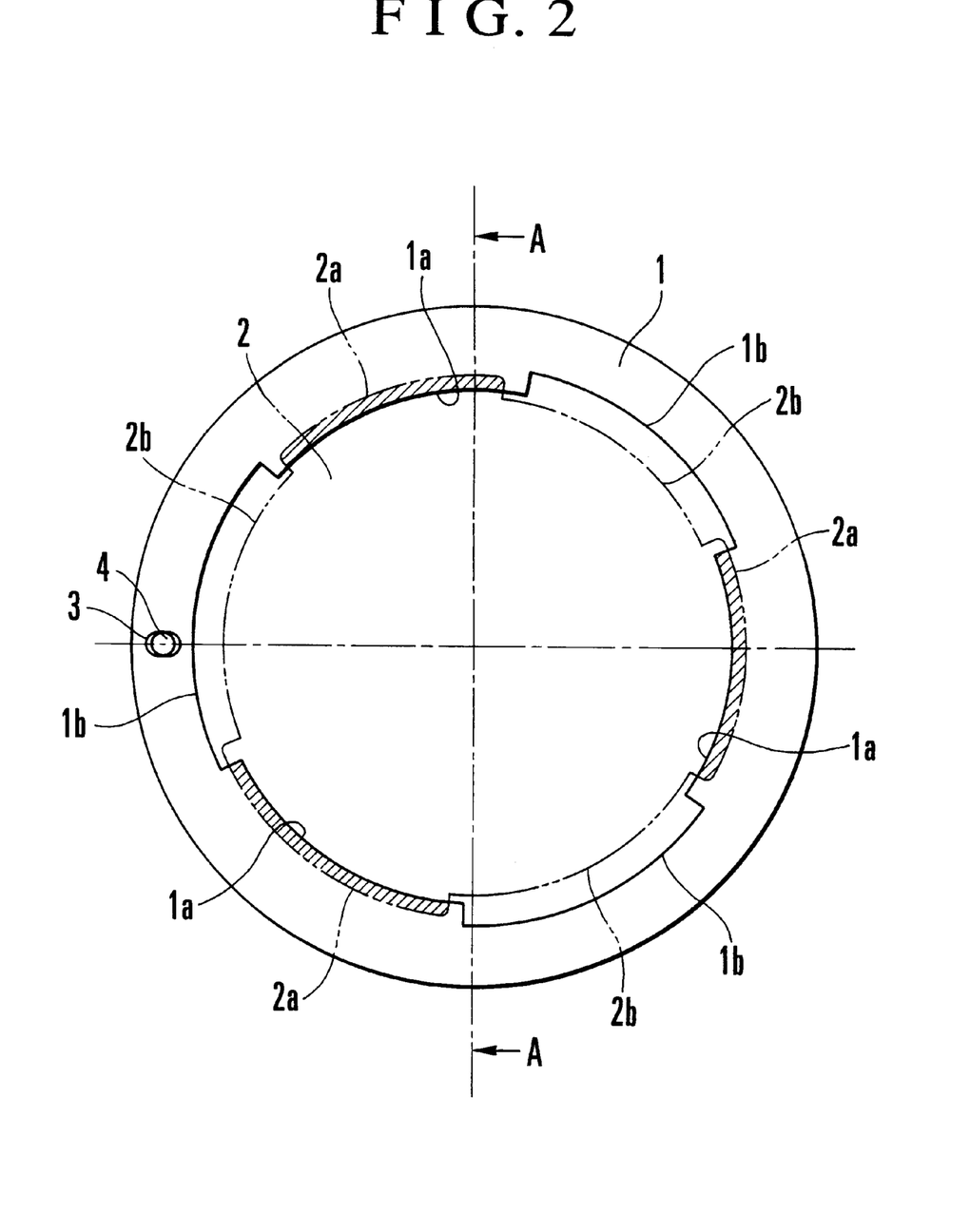
FIG. 2 is a front view showing a completely mounted state in which both bayonet mounts shown in FIG. 1 have engaged with each other.
Figure 3:
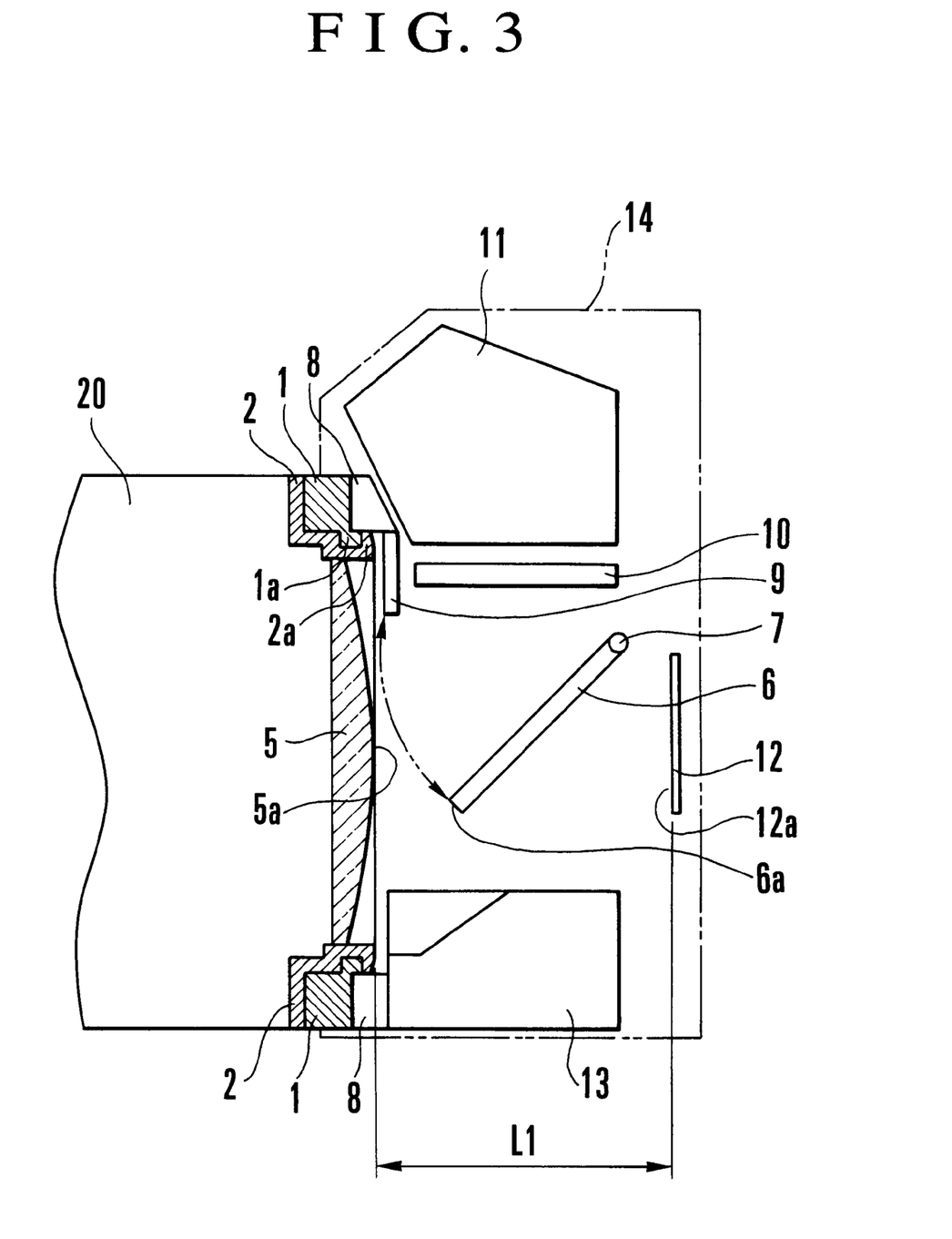
FIG. 3 is a sectional view taken on a line A—A shown in FIG. 2.

FIG. 1 is a front view showing a state in which a bayonet mount of an interchangeable lens of a camera system using a 135 film is inserted into a bayonet mount of a camera body of the same camera system before these bayonet mounts begin to engage with each other. FIG. 2 is a front view showing a completely mounted state in which both bayonet mounts shown in FIG. 1 have engaged with each other. FIG. 3 is a sectional view taken on a line A—A shown in FIG. 2.

The bayonet mounts shown in FIG. 1 are arranged to detachably couple the interchangeable lens of the conventional camera system using a 135 film with the camera body of the same camera system. The state shown in a front view in FIG. 1 is obtained before a mount 1 on the side of the camera body and a mount 2 on the side of the interchangeable lens begin to engage with each other. In this state, bayonet claws disposed on one side are inserted into bayonet cutout parts on the other side. In FIG. 1, reference numeral 1a denotes bayonet claws formed on the side of the camera body, and reference numeral 1b denotes bayonet cutout parts formed on the side of the camera body. Reference numeral 2a denotes bayonet claws formed on the side of the interchangeable lens, and reference numeral 2b denotes bayonet cutout parts formed on the side of the interchangeable lens.

The camera-body-side bayonet claws 1a are disposed at three of six sections of the inner circumferential edge of the mount 1 of the camera body. The bayonet cutout parts 1b are disposed at the remaining three sections of the inner circumferential edge of the mount 1 and are arranged alternately with the bayonet claws 1a. On the side of the interchangeable lens, the bayonet claws 2a are also disposed at three of six sections of the outer circumferential edge of the mount 2 respectively in positions which correspond to the positions of the bayonet cutout parts 1b of the camera body. The bayonet cutout parts 2b are disposed at the remaining three sections of the outer circumferential edge of the mount 2 respectively in positions which correspond to the positions of the bayonet claws 1a of the camera body.

Further, the configuration angle (the angle subtended by a circumferential length) of each of the bayonet claws 2a on the side of the interchangeable lens is set to be a little smaller than that of the corresponding bayonet cutout parts 1b on the side of the camera body. The configuration angle of each of the bayonet cutout parts 2b on the side of the interchangeable lens is set to be a little larger than that of the corresponding bayonet claws 1a on the side of the camera body. According to these configuration angle arrangements, the bayonet claws 1a and 2a do not interfere with each other when the mount 2 of the interchangeable lens is inserted into the mount 1 of the camera body at a normal angle position, as shown in FIG. 1, while the bayonet claws 1a and 2a interfere with each other to prevent insertion if the mount 2 of the interchangeable lens is intended to be inserted into the mount 1 of the camera body from any angle position other than the normal angle position.

The mount 2 of the interchangeable lens is provided with a lock hole 3. The mount 1 of the camera body is provided with a lock pin 4 which is arranged to pierce the mount 1 and to be movable back and forth. The camera body and the interchangeable lens are positioned into a coupled state by engaging the pin 4 into the lock hole 3. An angle θ1 obtained with respect to a base line which is orthogonal to a diametral line passing through the lock pin 4 is set as a reference angle of the bayonet claw 1a of the camera body on which the interchangeable lens of the camera system using a 135 film is to be mounted.

FIG. 2 shows in a front view the mount 1 on the side of the camera body and the mount 2 on the side of the interchangeable lens in a state of engaging with each other when the interchangeable lens is completely mounted on the camera body.

In mounting the interchangeable lens, a mount mark point (not shown) provided on the mount 2 of the interchangeable lens is adjusted to a mount mark point (not shown) provided on the mount 1 of the camera body. The mount 2 of the interchangeable lens is then turned, from the state of being inserted into the mount 1 of the camera body as shown in FIG. 1, in the direction of mounting (counterclockwise as viewed in FIG. 1). When the mount 2 of the interchangeable lens is turned to a position where the lock hole 3 on the side of the interchangeable lens engages with the lock pin 4 on the side of the camera body, there is obtained a completely mounted state in which the bayonet claws 1a and 2a engage with each other between the mounts 1 and 2 at three parts as indicated by hatching in FIG. 2. Further, there is provided a pressed-contact spring (not shown) between the mount 1 of the camera body and a front frame 8 of the camera body (FIG. 3) on which the mount 1 is mounted. The pressed-contact spring pushes the lens-side bayonet claws 2a against the camera body to effectively prevent the bayonet claws 1a and 2a from rattling not only while the interchangeable lens is in process of being mounted by turning it but also in the completely mounted state, so that the mounts 1 and 2 can be kept in tight contact with each other in the completely mounted state.

FIG. 3 is a sectional view taken on a line A—A shown in FIG. 2 and shows the camera system, including component parts of the camera body.

Referring to FIG. 3, the interchangeable lens is composed of a lens barrel 20, the mount 2, a rear lens 5, etc. The camera body includes a mirror 6 and a pivot shaft 7 which supports the mirror 6 for pivotal swinging. When the mirror 6 swings, a fore end 6a of the mirror 6 draws a locus as indicated by arrows. A restricting plate 9 mounted on the front frame 8 is arranged to restrict the moved-up position of the mirror 6 when the mirror 6 swings. The camera body further includes a focusing screen 10, a pentagonal prism 11, a film 12, an AF unit 13 and an outer appearance 14.

The positional relation between the camera body and the interchangeable lens is as follows. The interchangeable lens is considered to have been completely mounted on the camera body when the bayonet claws 1a on the side of the camera body engage with the bayonet claws 2a on the side of the interchangeable lens as shown in FIG. 2 as mentioned above. In the completely mounted state, a distance from a focal plane 12a on the film 12 to a rear end 5a of the rear lens 5 is considered to be the back focal distance L1 of the interchangeable lens.

On the side of the camera body, the mirror 6 is arranged not to interfere with the rear lens 5, by setting the locus (indicated by arrows) of the fore end 6a of the mirror 6 within a range shorter than the above-stated back focal distance L1.

Figure 4:
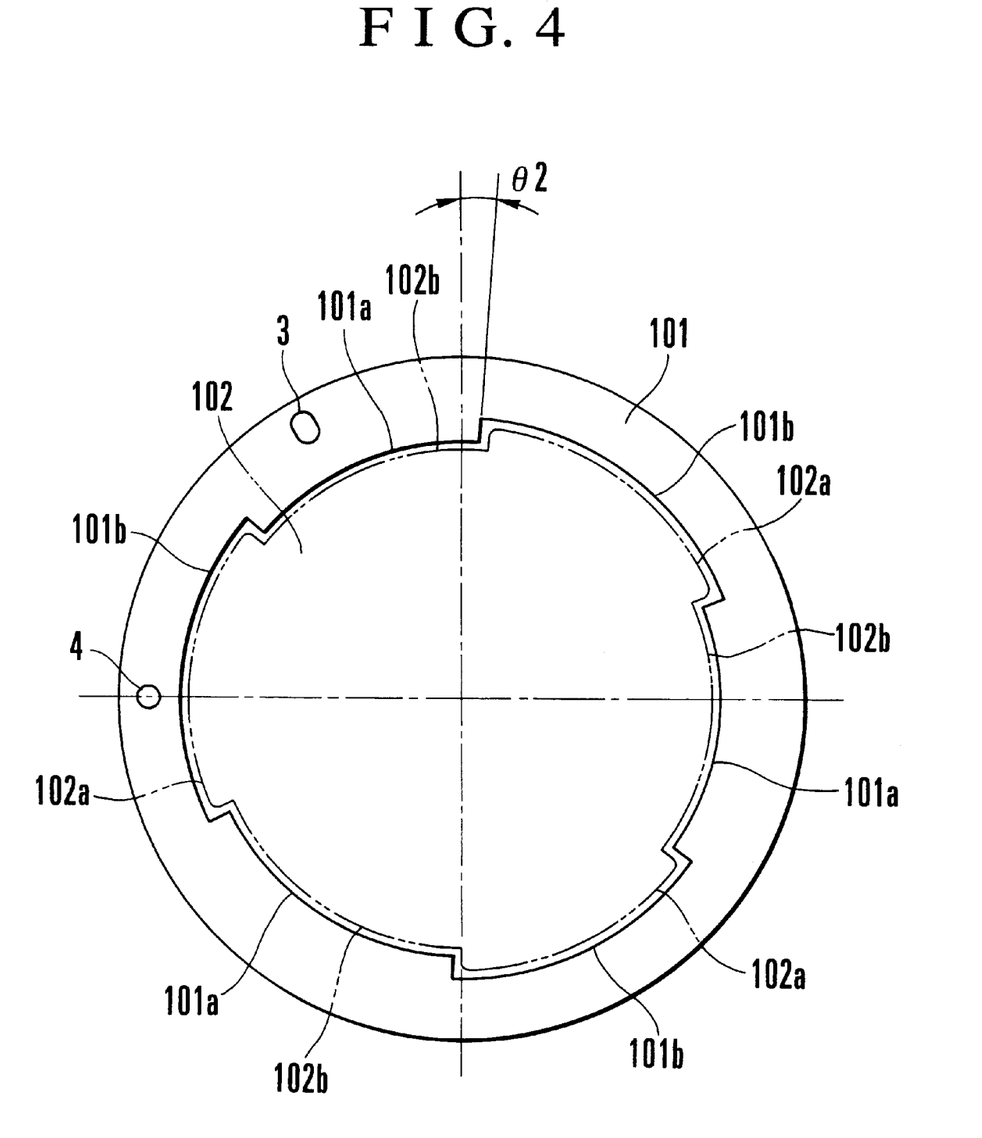
FIG. 4 is a front view showing a state in which a bayonet mount of an interchangeable lens of a camera system using an IX 240 film is inserted into a bayonet mount of a camera body of the same camera system before these bayonet mounts begin to engage with each other.
Figure 5:
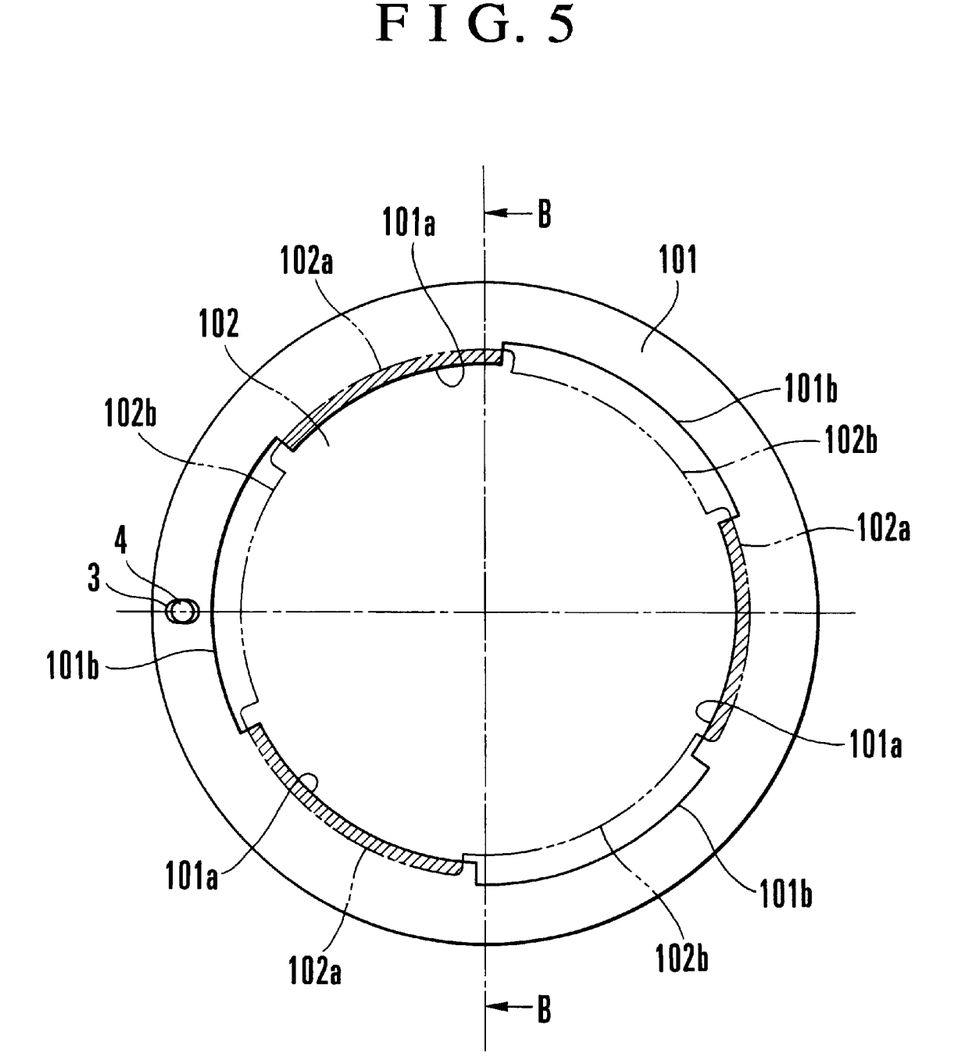
FIG. 5 is a front view showing a completely mounted state in which both bayonet mounts shown in FIG. 4 have engaged with each other.
Figure 6:
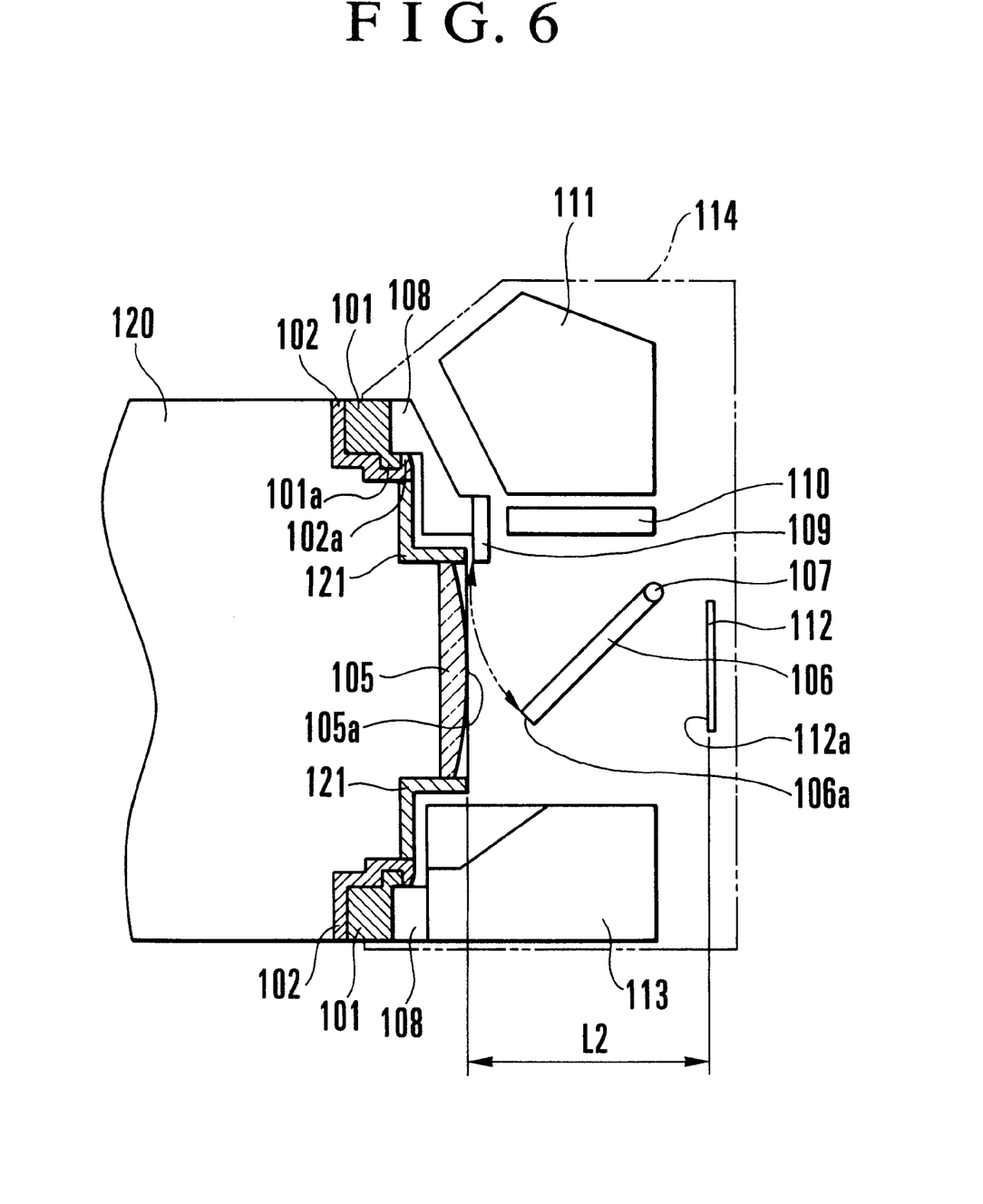
FIG. 6 is a sectional view taken on a line B—B shown in FIG. 5.

FIG. 4 is a front view showing a state in which a bayonet mount of an interchangeable lens of a camera system using an IX 240 film, which is a new film format, is inserted into a bayonet mount of a camera body of the same camera system before these bayonet mounts begin to engage with each other. FIG. 5 is a front view showing a completely mounted state in which both bayonet mounts shown in FIG. 4 have engaged with each other. FIG. 6 is a sectional view taken on a line B—B shown in FIG. 5.

In the case of FIG. 4, the interchangeable lens of the camera system using an IX 240 film is detachably coupled with the camera body of the same camera system. The state shown in FIG. 4 is similar to the state shown in FIG. 1. The mount 101 on the side of the camera body is provided with bayonet claws 101a and bayonet cutout parts 101b. The mount 102 on the side of the interchangeable lens is provided with bayonet claws 102a and bayonet cutout parts 102b.

The bayonet claws 101a on the side of the camera body are disposed at three of six sections of the inner circumferential edge of the mount 101 of the camera body. The bayonet cutout parts 101b are disposed at the remaining three sections of the inner circumferential edge of the mount 101 and are arranged alternately with the bayonet claws 101a. On the side of the interchangeable lens, the bayonet claws 102a are also disposed at three of six sections of the outer circumferential edge of the mount 102 respectively in positions corresponding to the cutout parts 101b on the side of the camera body. The bayonet cutout parts 102b are disposed at the remaining three sections of the outer circumferential edge of the mount 102 in positions corresponding to the bayonet claws 101a on the side of the camera body.

Further, the configuration angle of each of the bayonet claws 102a on the side of the interchangeable lens is set to be a little smaller than that of the corresponding bayonet cutout parts 101b on the side of the camera body. The configuration angle of each of the bayonet cutout parts 102b on the side of the interchangeable lens is set to be a little larger than that of the corresponding bayonet claws 101a on the side of the camera body. According to these configuration angle arrangements, the bayonet claws 101a and 102a do not interfere with each other when the mount 102 of the interchangeable lens is inserted into the mount 101 of the camera body at a normal angle position, as shown in FIG. 4, while the bayonet claws 101a and 102a interfere with each other to prevent insertion if the mount 102 of the interchangeable lens is intended to be inserted into the mount 101 of the camera body from any angle position other than the normal angle position.

A lock hole 3 and a lock pin 4 are arranged in the same manner as in the case of FIG. 1. An angle θ2 obtained with respect to a base line which is orthogonal to a diametral line passing through the lock pin 4 is set as a reference angle of the bayonet claw 101a of the camera body on which the interchangeable lens of the camera system using an IX 240 film is to be mounted. The reference angle θ2 is smaller than the reference angle θ1 shown in FIG. 1.

While only the configuration angles of the bayonet claws 1a and 101a on the side of the camera body have been described above, the configuration angles of the corresponding bayonet claws 2a and 102a on the side of the interchangeable lens are also adjusted respectively according to the reference angles θ1 and θ2.

FIG. 5 shows in a front view the mount 101 on the side of the camera body and the mount 102 on the side of the interchangeable lens in a state of engaging with each other when the interchangeable lens is completely mounted on the camera body.

In mounting the interchangeable lens, a mount mark point (not shown) provided on the mount 102 of the interchangeable lens is adjusted to a mount mark point (not shown) provided on the mount 101 of the camera body. The mount 102 of the interchangeable lens is then turned, from the state of being inserted into the mount 101 of the camera body as shown in FIG. 4, in the direction of mounting (counterclockwise as viewed in FIG. 4). When the mount 102 of the interchangeable lens is turned to a position where the lock hole 3 on the side of the interchangeable lens engages with the lock pin 4 on the side of the camera body, there is obtained a completely mounted state in which the bayonet claws 101a and 102a engage with each other between the mounts 101 and 102 at three parts as indicated by hatching in FIG. 5.

Further, there is provided a pressed-contact spring (not shown) between the mount 101 of the camera body and a front frame 108 of the camera body (FIG. 6) on which the mount 101 is mounted. The pressed-contact spring pushes the lens-side bayonet claws 102a against the camera body to effectively prevent the bayonet claws 101a and 102a from rattling not only while the interchangeable lens is in process of being mounted by turning it but also in the completely mounted state, so that the mounts 101 and 102 can be kept in tight contact with each other in the completely mounted state.

FIG. 6 is a sectional view taken on a line B—B shown in FIG. 5 and shows the camera system, including component parts of the camera body.

Referring to FIG. 6, the interchangeable lens is composed of a lens barrel 120, the mount 102 fixed to the lens barrel 120, a rear lens barrel 121, a rear lens 105 fixed to the rear lens barrel 121, etc. The camera body includes a swinging mirror 106 and a pivot shaft 107 which supports the mirror 106 for pivotal swinging. When the mirror 106 swings, a fore end 106a of the mirror 106 draws a locus as indicated by arrows. A restricting plate 109 mounted on the front frame 108 is arranged to restrict the moved-up position of the mirror 106 when the mirror 106 swings. The camera body further includes a focusing screen 110, a pentagonal prism 111, a film 112, an AF unit 113 and an outer appearance 114.

The positional relation between the camera body and the interchangeable lens is as follows. The interchangeable lens is considered to have been completely mounted on the camera body when the bayonet claws 101a on the side of the camera body engage with the bayonet claws 102a on the side of the interchangeable lens as shown in FIG. 5 as mentioned above. In the completely mounted state, a distance from a focal plane 112a on the film 112 to a rear end 105a of the rear lens 105 is considered to be the back focal distance L2 of the interchangeable lens.

In the case of the interchangeable lens of the camera system using an IX 240 film, the rear lens 105 is disposed at the rear lens barrel 121, which is closer to the camera body than the mount 102 on the side of the interchangeable lens. Therefore, the back focal distance L2 of the interchangeable lens of the camera system using an IX 240 film shown in FIG. 6 can be set to be shorter than the back focal distance L1 of the interchangeable lens of the camera system using a 135 film shown in FIG. 3. Then, in the camera body of the camera system using an IX 240 film, the locus of the fore end part 106a of the mirror 106 is set within a range shorter than the back focal distance L2, so that the mirror 106 is effectively prevented from interfering with the rear lens 105 of the interchangeable lens.

In the camera systems in the foregoing, the camera system using a 135 film has been described with reference to FIGS. 1, 2 and 3, and the camera system using an IX 240 film has been described with reference to FIGS. 4, 5 and 6.

Figure 7:
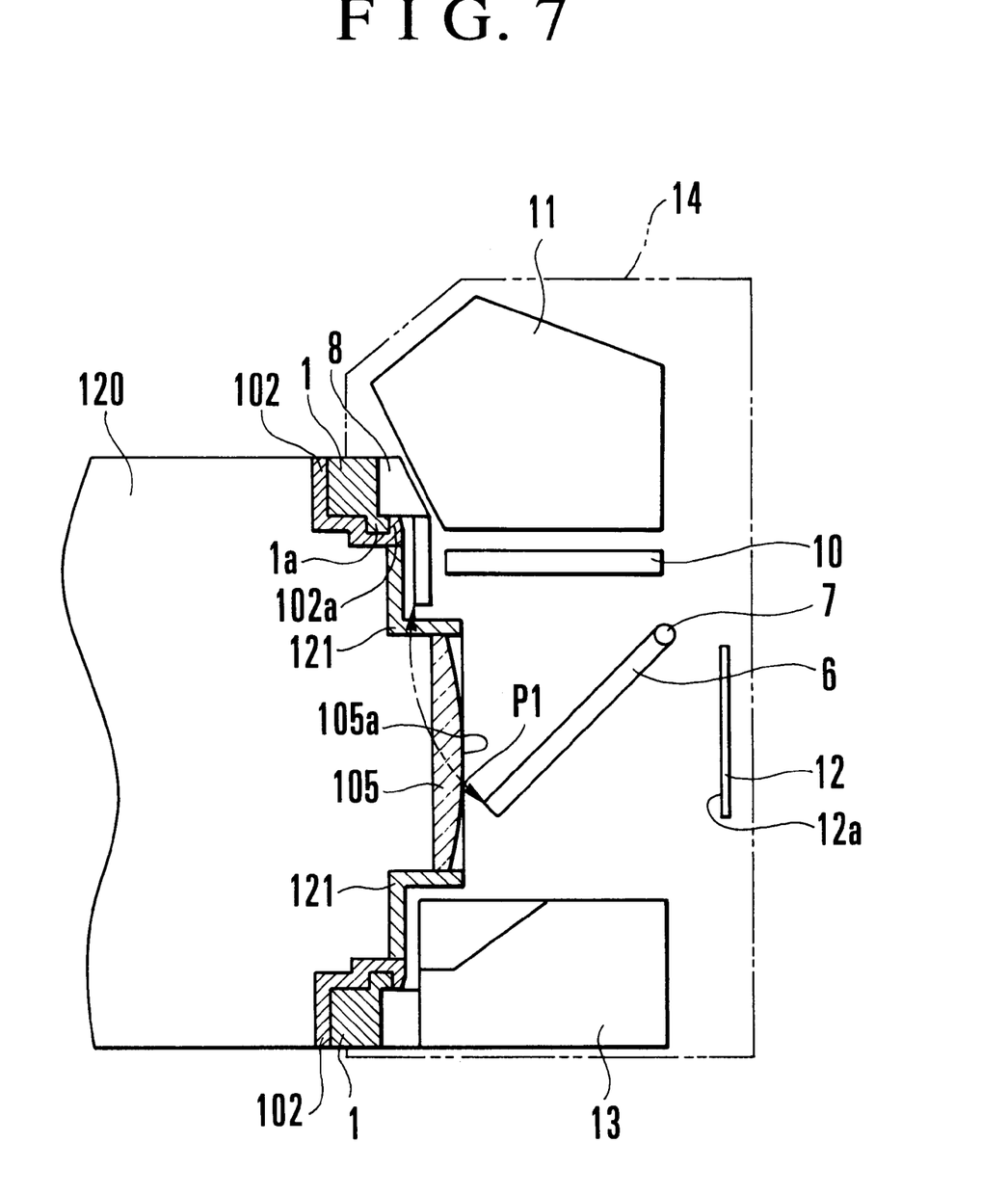
FIG. 7 is a sectional view showing a case where the interchangeable lens of the camera system using an IX 240 film is mounted on the camera body of the camera system using a 135 film.

FIG. 7 is an explanatory diagram indicating a problem arising in a case where the interchangeable lens of the camera system using an IX 240 film is mounted on the camera body of the camera system using a 135 film.

Figure 8:
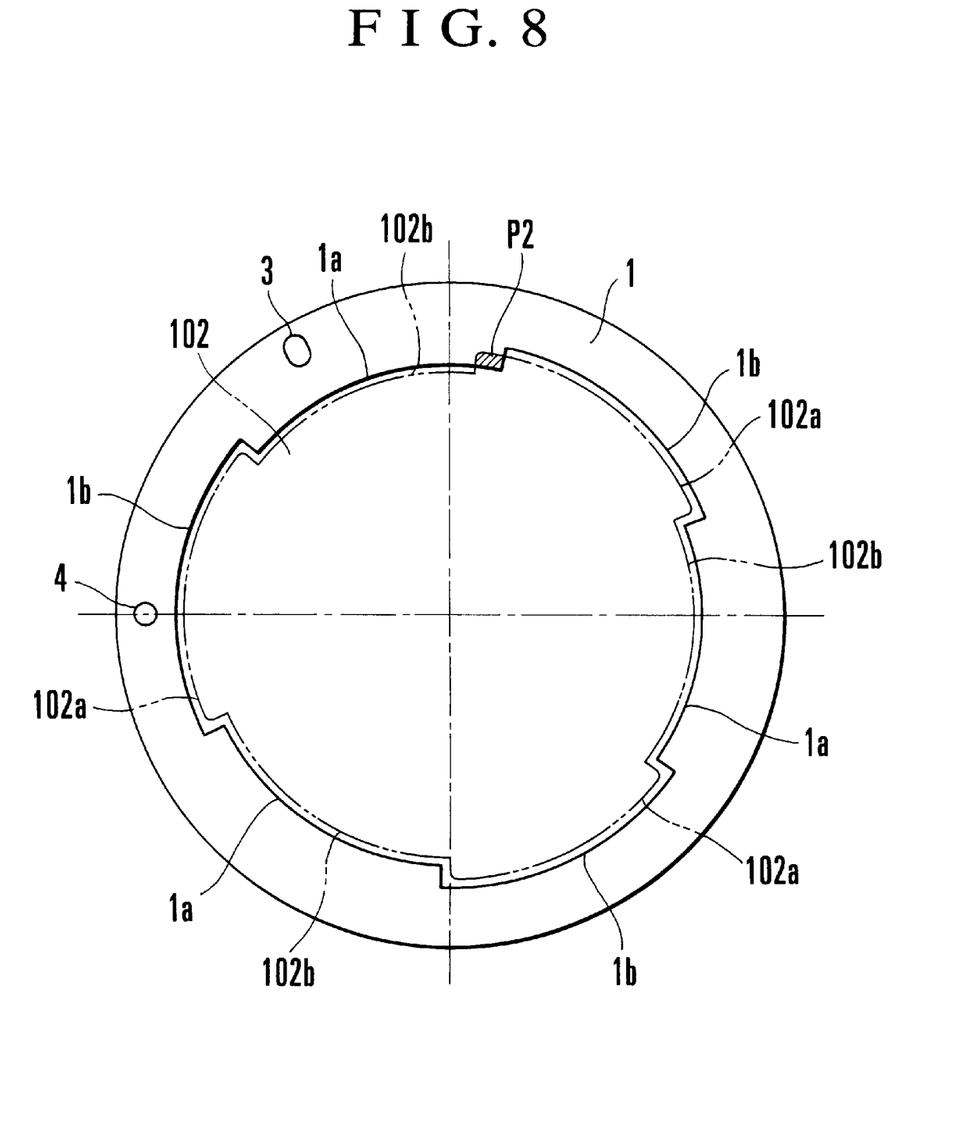
FIG. 8 is a front view showing the bayonet mounts in a case where the interchangeable lens of the camera system using an IX 240 film is to be mounted on the camera body of the camera system using a 135 film.

FIG. 8 is a front view showing the bayonet mounts in a case where the interchangeable lens of the camera system using an IX 240 film is intended to be mounted on the camera body of the camera system using a 135 film.

Figure 9:
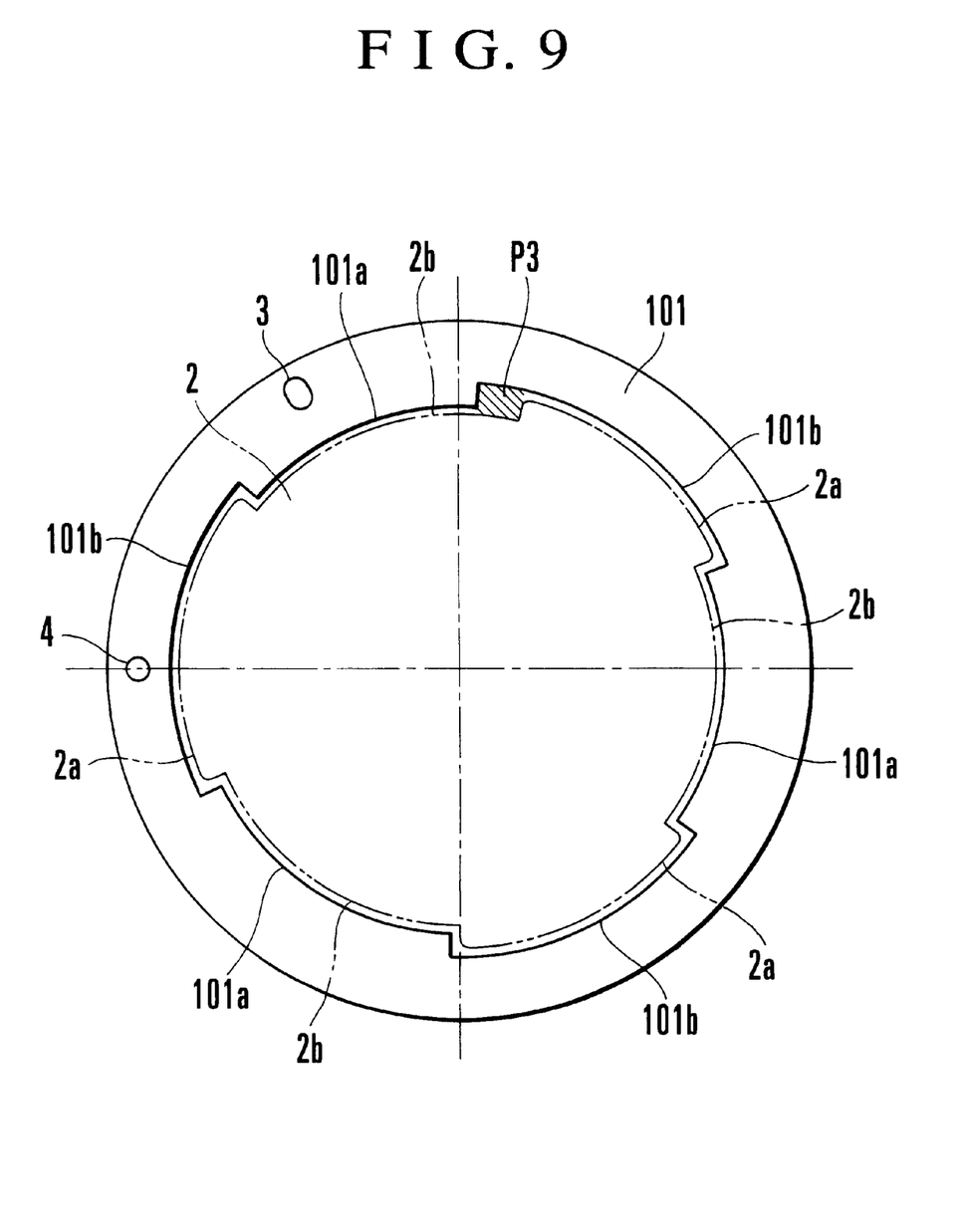
FIG. 9 is a front view showing the bayonet mounts in a case where the interchangeable lens of the camera system using a 135 film is to be mounted on the camera body of the camera system using an IX 240 film.

FIG. 9 is a front view showing the bayonet mounts in a case where the interchangeable lens of the camera system using a 135 film is to be mounted on the camera body of the camera system using an IX 240 film.

The area of one frame of an IX 240 film is smaller than that of a 135 film. Therefore, a mirror in the camera body of the camera system using an IX 240 film can be arranged to be smaller by as much as the difference in area of one frame than a mirror in the camera body of the camera system using a 135 film. If both the camera bodies are designed to have the same flange focal distance, the distance from the mount to the fore end of the mirror becomes larger in the camera body of the camera system using an IX 240 film than in the camera body of the camera system using a 135 film. Therefore, the rear lens of the interchangeable lens of the camera system using an IX 240 film can be disposed closer to the film surface than the rear lens of the interchangeable lens of the camera system using a 135 film. If the interchangeable lens, in which the rear lens is disposed in such a position, of the camera system using an IX 240 film is mounted on the camera body of the camera system using a 135 film, the fore end of the mirror would come to impinge on the rear lens of the interchangeable lens. FIG. 7 shows, in a sectional view, such a case where the interchangeable lens of the camera system using an IX 240 film is mounted on the camera body of the camera system using a 135 film.

In FIG. 7, assuming that the mount 1 on the side of the camera body and the mount 102 on the side of the interchangeable lens are arranged for mounting in the same manner as in the cases of FIGS. 3 and 6, a distance from the rear lens 105 of the interchangeable lens to the focal plane 12a on the film 12 is equal to the back focal distance L2. However, since the camera body is of the camera system using a 135 film, the mirror 6 disposed in that camera body is larger than a mirror disposed in the camera body of the camera system using an IX 240 film. In this case, therefore, the locus of the swinging motion of the fore end part 6a of the mirror 6 indicated by arrows interferes with the rear lens 105, that is, the fore end part 6a of the mirror 6 thus comes to impinge on the rear lens 105 at a point P1 as shown in FIG. 7.

In other words, if the interchangeable lens of the camera system using an IX 240 film can be mounted on the camera body of the camera system using a 135 film, the mirror 6 of the camera body would interfere with the rear lens 105 of the interchangeable lens, thereby hindering a photographing operation when a shutter release action is performed after completion of mounting the interchangeable lens on the camera body. Besides, in such a case, the camera body and the interchangeable lens tend to be damaged by the impingement of the mirror 6.

FIG. 8 shows in a front view the bayonet mounts in a case where the interchangeable lens of the camera system using an IX 240 film is intended to be mounted on the camera body of the camera system using a 135 film. The mount on the side of the camera body is the same as in the case of FIG. 1. The mount on the side of the interchangeable lens is the same as the mount 102 shown in FIG. 4. A configuration angle of the bayonet claw 1a of the mount 1 on the side of the camera body is configured corresponding to the reference angle θ1. A configuration angle of the bayonet claw 102a of the mount 102 on the side of the interchangeable lens is configured corresponding to the reference angle θ2.

Under such a condition, an interfering part P2 which is indicated by hatching in FIG. 8 prevents the interchangeable lens from being mounted on the camera body. When the mount 102 of the interchangeable lens is intended to be inserted from a normal angle position into the mount 1 of the camera body, the bayonet claws 1a and 102a interfere with each other. The mount 102 also cannot be inserted from any other angle position. The trouble described above with reference to FIG. 7 thus can be prevented.

Therefore, since the interchangeable lens of the camera system using an IX 240 film cannot be mounted on the camera body of the camera system using a 135 film, the trouble shown in FIG. 7 can be effectively prevented.

FIG. 9 is a front view showing a state in which the bayonet mount of the interchangeable lens of the camera system using a 135 film is inserted into the bayonet mount of the camera body of the camera system using an IX 240 film before these bayonet mounts engage with each other by rotating relative to each other.

Referring to FIG. 9, a configuration angle of the bayonet claw 101a of the mount 101 on the side of the camera body is configured corresponding to the reference angle θ2. A configuration angle of the bayonet claw 2a of the mount 2 on the side of the interchangeable lens is configured corresponding to the reference angle θ2. In this case, a part indicated by hatching in FIG. 9 provides a void space part P3 for allowing the interchangeable lens to be mounted on the camera body.

Therefore, the interchangeable lens of the camera system using a 135 film can be mounted not only on the camera body of the camera system using a 135 film but also on the camera body of the camera system using an IX 240 film. The interchangeable lens of the camera system using an IX 240 film, on the other hand, cannot be mounted on the camera body of the camera system using a 135 film and is mountable only on the camera body of the camera system using an IX 240 film. Then, whether or not an interchangeable lens can be mounted on a camera body is determined by suitably setting the configuration angles of the bayonet claws 2a and 102a of the interchangeable lens and the configuration angles of the bayonet claws 1a and 101a of the camera body.

Although it is not shown in the drawings, both the camera system using a 135 film and the camera system using an IX 240 film are arranged to have the same flange focal distance, which indicates a distance from the lens mounting surface of the mount 1 or 101 on the side of the camera body to the focal plane 12a or 112a on the film 12 or 112.

The arrangement for providing the same flange focal distance enables the camera system using an IX 240 film to use as it is the interchangeable lens of the camera system using a 135 film.

Further, since the interchangeable lens of the camera system using an IX 240 film is allowed to have its rear lens disposed close to the surface of a film in use, the interchangeable lens can be arranged to have a smaller size in the direction of its optical axis.

According to the arrangement of the embodiment of this invention described above, an interchangeable lens of a camera system using a 135 film can be mounted also on a camera body of a camera system using an IX 240 film as well as on a camera body of the camera system using a 135 film, and an interchangeable lens of the camera system using an IX 240 film is mountable only on the camera body of the camera system using an IX 240 film. Further, a determination as to whether or not an interchangeable lens can be mounted on a camera body is reliably attained by just altering the configuration angle of the bayonet claw of the interchangeable lens and that of the bayonet claw of the camera body to a minimum necessary degree.

What is claimed is:

1. A second camera system different from a first camera system in size of film to be used, said first camera system being composed of a first camera body having a first camera bayonet mount and using a film of a first size and a first interchangeable lens having a first lens bayonet mount which is connectable to said first camera bayonet mount of said first camera body, said second camera system comprising:

a second camera body having a second camera bayonet mount of which an angle subtended by a circumferential length (defined herein as a "configuration angle") of one bayonet claw thereof is different from a configuration angle of a corresponding one of the bayonet claws of said first camera bayonet mount and using a film of a second size which is smaller than the first size, the number of bayonet claws of said second camera bayonet mount being equal to the number of bayonet claws of said first camera bayonet mount; and a second interchangeable lens having a second lens bayonet mount which is connectable to said second camera bayonet mount and of which a configuration angle of one bayonet claw thereof is different from the configuration angle of a corresponding one of the bayonet claws of said first lens bayonet mount, the number of bayonet claws of said second lens bayonet mount being equal to the number of bayonet claws of said first lens bayonet mount, wherein the configuration angles of the bayonet claws of said second camera bayonet mount are set such that said second camera bayonet mount is connectable to both said first lens bayonet mount and said second lens bayonet mount, and the configuration angles of the bayonet claws of said second lens bayonet mount are set such that said second lens bayonet mount is connectable only to said second camera bayonet mount.

2. A second camera system according to claim 1, wherein the configuration angle of said one bayonet claw of said second lens bayonet mount is set larger than the configuration angle of said corresponding one of the bayonet claws of said first lens bayonet mount.

3. A second camera system according to claim 1, wherein a flange focal distance of said second camera body is set equal to a flange focal distance of said first camera body.

4. A second camera system according to claim 1, wherein each of said first camera body and said second camera body has a mirror arranged to direct a photographing light flux to a viewfinder, and the mirror of said second camera body is set smaller than the mirror of said first camera body.

5. A second camera system according to claim 4, wherein said second interchangeable lens has a shorter back focal distance than said first interchangeable lens.

* * * * *